UNITED STATES PATENT OFFICE.

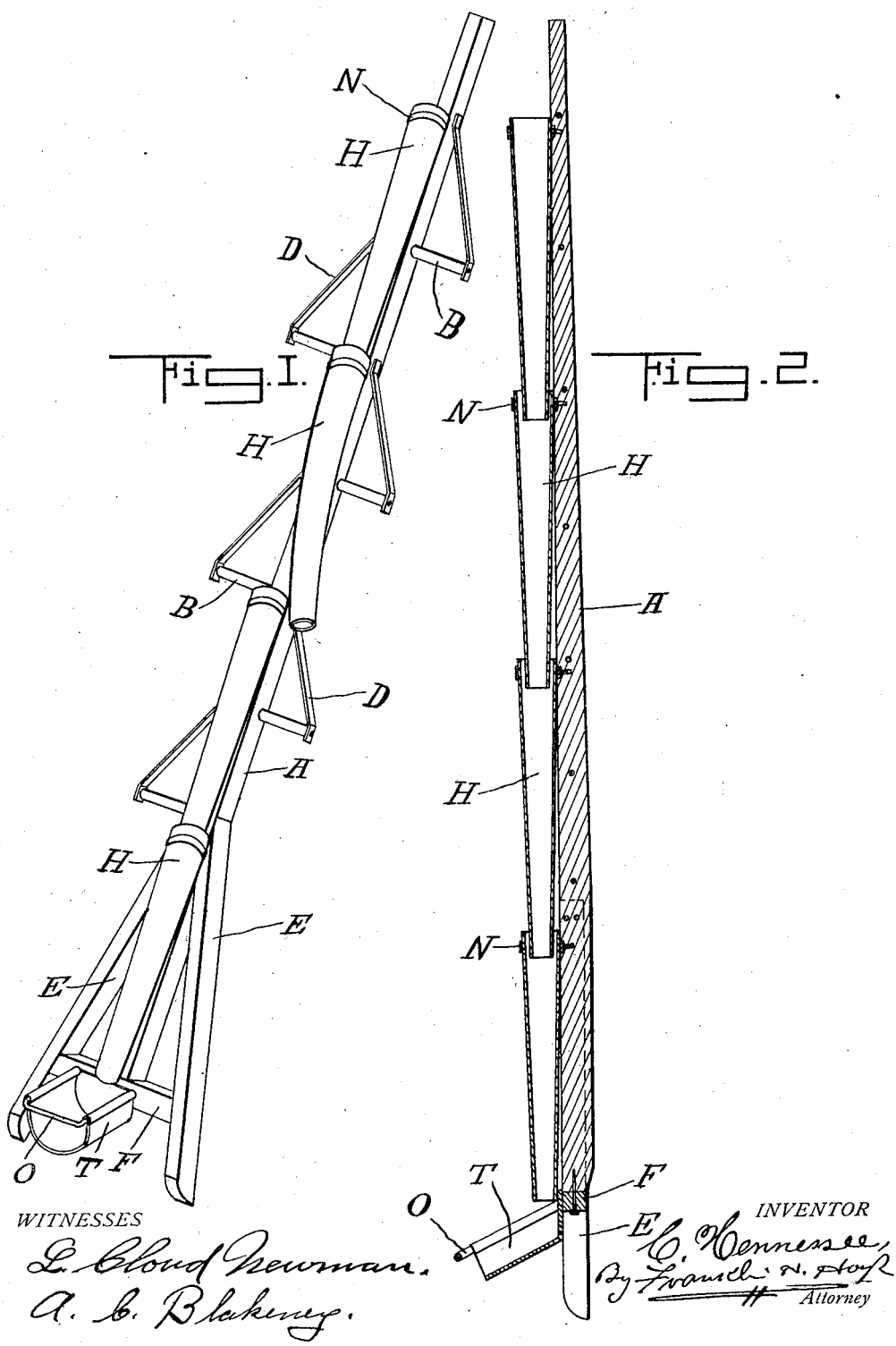

CLAUDE HENNESSEE, OF MACON, GEORGIA.

FRUIT-GATHERER.

1,005,032.　　　　Specification of Letters Patent.　　Patented Oct. 3, 1911.

Application filed May 11, 1911. Serial No. 626,512.

*To all whom it may concern:*

Be it known that I, CLAUDE HENNESSEE, a citizen of the United States, residing at Macon, in the county of Bibb and State of Georgia, have invented certain new and useful Improvements in Fruit-Gatherers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in fruit gathering apparatus and comprises a simple and efficient device of this nature which may be applied to a ladder and so arranged that the fruit may be picked at different elevations and placed within one or another of the series of spouts, which will convey the fruit to the ground without bruising the same.

The invention comprises various details of construction and combinations and arrangements of parts which will be hereinafter fully described and then specifically defined in the appended claims.

I illustrate my invention in the accompanying drawings, in which:—

Figure 1 is a perspective view showing the application of my device to a ladder, and Fig. 2 is a vertical central sectional view through the device.

Reference now being had to the details of the drawings by letter, A designates a pole or bar, forming a portion of the ladder, and which has projecting alternately therefrom the rounds B and braces D are fastened at corresponding ends to said pole or bar and also to the outer ends of the rounds, forming not only braces but also each serving as a guard to hold the foot from sliding off the end of the round. Said bar is fastened near its lower end to the laterally inclined braces E, the bottoms of which are adapted to rest upon the ground or any other object and a cross-piece F connects said inclined braces and to which the lower end of the pole or bar is fixed. Fastened to the pole or bar, preferably by means of bands or belting or other suitable material, is a series of chutes H, made of any suitable flexible material such as canvas, and each chute is made preferably tapering and one is adapted to telescope within another. Each chute is fastened to the pole or bar by means of the band N and each is of sufficient size to allow fruit of different sizes to pass freely therethrough.

Fastened to the cross-piece F, which connects the inclined braces E, is a U-shaped rod O which is disposed in the position shown and supported by the opposite arms of said rod is a "fall break" or trough T of canvas or other suitable material upon which the fruit is adapted to strike as it leaves the lowermost of the chutes and, being of soft material, will avoid the bruising of the fruit and breaking its fall before the same rolls out the end of the trough.

If desired, the device may be utilized in connection with an ordinary ladder by simply resting the pole or bar against the rounds thereof.

In operation, the device is set up where desired for use and the operator, by means of the laterally projecting rounds, may mount the pole to different elevations and may drop the fruit as it is picked into the upper end of any one of the super-imposed chutes. In the event of it being desired to deposit fruit in one of the intermediate chutes, the telescoping end of the chute above may be withdrawn from the lower chute, thus allowing the fruit to be conveniently inserted within the chutes below and, as the fruit drops, it will come in contact with the trough or "fall break" down which it rolls into a receptacle upon the ground as may be desired.

What I claim to be new is:—

1. A fruit gathering apparatus comprising a pole, a series of pliable, tapering, distended chutes telescoping within one another, pins securing the upper end of each chute to the pole and the lower ends of the chutes being free, and each being adapted to be withdrawn from the chute into which it telescopes and to swing laterally.

2. A fruit gathering apparatus comprising a pole, rounds alternately arranged on opposite sides of the pole and projecting therefrom, braces connecting the outer end of each round with the pole, a series of pliable tapering distended chutes, each chute being fastened at its upper end to said pole and its lower end being adapted to telescope within the upper end of a lower chute.

In testimony whereof I hereunto affix my signature in the presence of two witnesses.

CLAUDE HENNESSEE.

Witnesses:
JNO. R. GANTT,
S. P. HILLYER.

Copies of this patent may be obtained for five cents each, by addressing the "Commissioner of Patents, Washington, D. C."